United States Patent [19]

Huddleston, Jr. et al.

[11] 4,340,702
[45] Jul. 20, 1982

[54] ULTRAFILTRATION OF VINYL RESIN LATICES AND REUSE OF PERMEATE IN EMULSION POLYMERIZATION

[75] Inventors: George R. Huddleston, Jr., Lorain; James W. Turner, Bay Village, both of Ohio

[73] Assignee: The B. F. Goodrich Company, Akron, Ohio

[21] Appl. No.: 86,853

[22] Filed: Oct. 22, 1979

[51] Int. Cl.$^3$ .............................. C08F 2/26; C08F 6/20
[52] U.S. Cl. .................................. 526/70; 210/636; 526/212; 526/225; 526/228
[58] Field of Search ................ 526/70, 212, 225, 228; 210/23 F, 23 H

[56] References Cited

U.S. PATENT DOCUMENTS

| | | | |
|---|---|---|---|
| 3,129,207 | 4/1964 | James | 526/70 |
| 3,324,097 | 6/1967 | Pears | 526/206 |
| 3,956,114 | 5/1976 | Del Pico | 210/23 F |
| 3,974,068 | 8/1976 | Ebner | 210/23 F |
| 3,977,967 | 8/1976 | Trulson | 210/23 F |
| 4,076,920 | 2/1978 | Mikofalvy | 526/74 |
| 4,082,659 | 4/1978 | Heinze | 210/23 F |
| 4,160,726 | 7/1979 | Del Pico | 210/23 F |

*Primary Examiner*—C. A. Henderson
*Attorney, Agent, or Firm*—Roy P. Wymbs; Alan A. Csontos

[57] ABSTRACT

There is disclosed a process of preparing vinyl dispersion resins by conducting the polymerization reaction of the vinyl monomer or monomers in an aqueous medium in the presence of a polymerization initiator or catalyst and an emulsifier or emulsifier system to form a vinyl resin latex, which is then subjected to an ultrafiltration step by forcing the same through a semipermeable membrane leaving behind the polymer particles and reusing the permeate, which contains dissolved monomer(s) and emulsifier, in the further production of vinyl resin latices. Unexpectedly, further use of the permeate substantially reduces polymer buildup in the reactor and since the ultrafiltration step increases the polymer particle concentration in the latex, considerable heat energy is saved in the spray-drying step.

16 Claims, No Drawings

ULTRAFILTRATION OF VINYL RESIN LATICES AND REUSE OF PERMEATE IN EMULSION POLYMERIZATION

BACKGROUND OF THE INVENTION

Various processes have heretofore been proposed and employed in order to attain vinyl plastisol resins with high plasticizer capacity and having increased flexibility, workability and distensibility. Chief among these processes have been the customary emulsion polymerization processes. In emulsion polymerization of vinyl and vinylidene halides to make polymers and copolymers thereof, relatively large quantities of soap are employed which leads to difficulties in processing the finished dispersion or paste vinyl resins.

In emulsion polymerization, the finished product formed is a polymer latex which, theoretically, can be coagulated and remove the polymer particles which then can be dried. Hoever, this is extremely difficult to do without forming agglomerates of polymer which cannot be disintegrated. Further, these agglomerates are excessively large and detract from the usefulness of the resin when subsequently making vinyl resin plastisols. As a result, it has been the common practice in the industry to take the latex having polymer particles of the proper size and spray-dry the entire materials. However, this procedure presents problems, one of which is that when spray-drying, all of the emulsifier or soap, initially added to the polymerization mixture, is deposited on the polymer particles. The large quantity of soap so deposited usually shows up as a cloudiness, or a turbidity, when the resin or polymer is fused with a plasticizer in making a plastisol. Also, the large amount of soap present adversely affects the viscosity of the plastisol in that it produces a higher yield value than that desired. Further, the heat stability of the plastisol is affected by the soap since the same discolors at processing temperatures producing off-colored products.

Many attempts have heretofore been made to remove the soap from vinyl dispersion resins by simple washing but all of these have run into various kinds of technical problems. Various technical solutions have been proposed to solve this problem but most all have been expensive and complicated that as a result, the resin so produced was no longer competitive in the market place. As a result, little has been done to remove the soap after the spray-drying operation. Attempts have also been made to lower the soap content in the polymerization recipe but a high soap concentration is necessary in order to give the polymer latex stability and to prevent agglomeration.

In addition to the above problems in making vinyl plastisol resins by the emulsion polymerization technique, another frustrating and detrimental problem in the commercial production of polymers and copolymers of vinyl and vinylidene halides, when polymerized alone or with the other vinylidene monomers having a terminal $CH_2=C<$ group, is the formation of undesirable polymer buildup on the inner surfaces of the reactor. This deposit or buildup of polymer on said reactor surfaces not only interferes with heat transfer but also decreases productivity and adversely affects polymer quality, such as producing finer particles than desired with the resultant adverse effect on plastisol viscosity. Obviously, this polymer buildup must be removed. If not, more polymer buildup occurs rapidly on that already present resulting in a hard, insoluble crust which is extremely difficult to remove without a manual scraping operation. It would be desirable, of course, to have an emulsion polymerization process in which polymer buildup does not occur. Unfortunately, none of the known emulsion polymerization processes are capable of solving this problem completely, as well as the other problems reiterated above. There is a definite need in the art for a polymerization process via the emulsion route which meets all of these criteria.

SUMMARY OF THE INVENTION

It has unexpectedly been found that vinyl resin latices can be produced which have all the necessary and desirable properties with little or no polymer buildup on the internal surfaces of the reactor. The process of the present invention comprises the steps of ultrafiltration of the latex by forcing the same through a semipermeable membrane leaving behind the polymer particles and reusing the permeate, which contains dissolved monomer(s) and emulsifier, in the further production of vinyl resin latices. Surprisingly, the further use of the permeate substantially reduces polymer buildup and since the ultrafiltration step increases the polymer particle concentration in the latex, considerable heat energy is saved in the spray-drying step.

DETAILED DESCRIPTION

In the present invention, "vinyl dispersion resin" refers to polymers and copolymers of vinyl and vinylidene halides, such as vinyl chloride, vinylidene chloride, and the like. The vinyl halides and vinylidene halides may be copolymerized with each other or either may be copolymerized with one or more vinylidene monomers having at least one terminal $CH_2=C<$ grouping. As examples of such vinylidene monomers may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl ethers, such as ethyl vinyl ether, chloroethyl vinyl ether and the like; the vinyl ketones; styrene and styrene derivatives including vinyl toluene chlorostyrene, and the like; vinyl naphthalene, allyl and vinyl chloroacetate, vinyl acetate, vinyl pyridine, methyl vinyl ketone, and other vinlidene monomers of the types known to those skilled in the art. The present invention is particularly applicable to the manufacture of vinyl dispersion resins made by the emulsion polymerization of vinyl chloride or vinylidene chloride alone or in admixture with one or more vinylidene monomers copolymerizable therewith in amounts as great as about 80% by weight, based on the weight of the monomer mixture. The most preferred vinyl dispersion resin is polyvinyl chloride (PVC) and the invention, for simplicity and convenience, will be described in connection therewith, it being understood that this is merely intended in an illustrative sense and not limitative.

In preparing vinyl dispersion resins by the emulsion polymerization technique in an aqueous medium the polymerization recipe will contain a proper catalyst or a free radical yielding initiator as well as a useful emulsifying agent or emulsifier system. In addition, the polymerization recipe may contain appropriate compounds to adjust the pH thereof to the proper level, for example, by using ammonium hydroxide. In addition, one may employ buffering agents in the reaction medium such as trisodium phosphate, tetrasodium pyrophosphate, and the like. In any event, the vinyl polymer latex produced may subsequently be adjusted to any desired pH by suitable means.

Useful free radicals yielding catalysts or initiators for making vinyl dispersion resins include, for example, the various peroxygen compounds, such as persulfates, benzoyl peroxide, t-butyl hydroperoxide, t-butyl peroxypivalate, cumene hydroperoxide, t-butyl diperphathalate, perlargonyl peroxide, 1-hydroxycyclohexyl hydroperoxide, and the like; azo compounds, such as azodiisobutyronitrile, dimethylazodiisobutyrate, and the like. Particularly useful initiators are the water-soluble peroxygen compounds, such as hydrogen peroxide, isopropyl peroxydicarbonate, and the like, and the sodium, potassium and ammonium persulfates used by themselves or in an activated redox system. Typical redox systems include alkali metal persulfates in combination with a reducing substance, such as sodium sulfite or sodium bisulfite, a reducing sugar, dimethylamino propionitrile, a diazomercapto compound and a water-soluble ferricyanide compound, or the like. Heavy metal ions may also be used to activate the persulfate catalyzed polymerization. Particularly useful are alkali metal and ammonium persulfate. The amount of initiator used will generally be in the range between about 0.02% and about 1.0% by weight, based on the weight of 100 parts of monomer or monomers being polymerized, and preferably between about 0.05% and about 1.0% by weight.

Insofar as emulsifiers are concerned in preparing vinyl dispersion resins, the general types of anionic and nonionic emulsifiers are employed. Useful anionic emulsifiers include alkali metal or ammonium salts of the sulfates of alcohols having from 8 to 18 carbon atoms, such as sodium lauryl sulfate, ethanolamine lauryl sulfate, ethylamine lauryl sulfate, and the like; alkali metal and ammonium salts of sulfonated petroleum and paraffin oils; sodium salts of aromatic sulfonic acids, such as dodecane-1-sulfonic acid and octadiene-1-sulfonic acid; aralkyl sulfonates, such as sodium isopropyl benzene sulfonate, sodium dodecyl benzene sulfonate, sodium isobutyl naphthalene sulfonate, and the like; alkali metal and ammonium salts of sulfonate dicarboxylic acid esters, such as sodium dioctyl sulfosuccinate, disodium-n-octadecyl sulfosuccinate, and the like; alkali metal and ammonium salts of free acid of complex organic mono- and diphosphate esters, and the like. Nonionic emulsifiers such as octyl- or nonylphenyl polyethoxyethanol, may also be used. Vinyl polymer latices having excellent stability are obtained when employing the alkali metal and ammonium salts of aromatic sulfonic acid, aralkyl sulfonates and long chain sulfonates. The amount of emulsifer employed may range in amount up to about 6% or more by weight, based on the weight of 100 parts of monomer or monomers being polymerized. Preferably, the amount of emulsifier will be in the range of about 1.0% to about 3.0% by weight.

In using certain of the vinyl dispersion resins, there is optionally employed, in addition to the emulsifier, a long straight chain saturated alcohol containing from 8 to 24 carbon atoms in combination with the emulsifier. As examples of such alcohols, there may be named tetradecanol, pentadecanol, hexadecanol, heptadecanol, octadecanol, nonadecanol, eicosanol, heneicosanol, docosanol, tricosanol, tetracosanol, and the like. Mixtures of the alcohols can also be employed. For example, a mixture of a 12 carbon alcohol and an 18 carbon alcohol can be used. Also, lower carbon content alcohols can be employed when mixed with the longer chain alcohols. For example, a mixture of dodecanol and octadecanol. When optionally employing an alcohol, a ratio of alcohol to emulsifier of 1.0 can be used. However, the best results are obtained when said ratio is greater than 1.0.

The emulsion polymerization reaction can be conducted at a pH in the range of about 7.0 to about 12.0. It is preferred, however, to operate in a pH range of about 8.0 to about 10.5 since, if the pH is too high, it takes too much base to keep the same adjusted and if the pH is too low, for example, below 7.0, the polymer build-up in the reactor increases and the coagulum increases. The amount of base needed to properly adjust the pH will depend in part on the particular emulsifier system being used in the reaction mixtures.

The temperature of the reaction is important since the inherent viscosity (IV) is a direct function of the temperature of reaction. That is, the higher the temperature the lower the IV. Accordingly, the end use for the resin to be produced will normally dictate the reaction temperature. For example, when producing dispersion resins to be used in coatings or casting flexible films, a lower temperature will be used in order to obtain a higher IV which is desirable for many coating applications. It has been found that for most end uses, polymerization temperatures in the range of about 30° C. to about 70° C. are satisfactory. It is preferred, however, to employ a temperature in the range of about 40° C. to about 55° C. It should be noted that as the temperature of reaction is increased, the polymer buildup increases. However, the buildup is not of the hard crusty type and can readily be removed by rinsing or hosing down with water and without opening the reactor when appropriate spray nozzles are installed in the reactor.

Upon completion of the polymerization reaction, the reactor is put under vacuum in order to remove as much of the unreacted monomers as possible and send them to a recovery system. In order to get the unreacted monomer level down within the Governmental limitations, the vinyl polymer latex is pumped into a vacuum tank along with steam wherein the monomer, such as vinyl chloride, is flashed off and sent to the recovery system. This is known as the stripping step and the vacuum tank is referred to as the "stripper".

The novel part and the critical aspect of the present invention is the next two steps wherein the latex from the stripping step is subjected to ultrafiltration and the filtrate or permeate therefrom is recirculated to the polymerization reactor for the next polymerization run, after analysis of the contents thereof, as hereinafter pointed out. The purpose of the ultrafiltration is to increase the solids content of the polymer latex and decrease the energy required in the subsequent spray drying step wherein the dry polymer is isolated. This is important with respect to the energy saving requirements that the Government is presently quite concerned about.

In the process of ultrafiltration, a dispersion medium or emulsion polymer latex is forced through a semipermeable membrane under a relatively low pressure leaving behind solid particles or droplets of polymer emulsion and high molecular weight dissolved molecules. For vinyl polymer emulsions or latices usually a pressure in the range of about 5 psig to about 60 psig is employed. It is preferred, however, to employ a pressure in the range of about 10 psig to about 50 psig. The lower molecular weight dissolved molecules and salts readily pass through the membrane with the resultant concentration of the vinyl polymer latex.

While various types of apparatus may be employed in the ultrafiltration of the vinyl polymer latex, a suitable apparatus, at least for experimental purposes, is an elongated tube having a tubular backing therein on the inner surface of which is deposited a semi-permeable membrane. The backing or membrane support can be epoxy reinforced fiberglass and the usual membranes are comprised of a cellulosic base material. However, in the present invention the membranes must be organic solvent resistant which the cellulosic membranes are not. Suitable membranes for use in the present invention are those manufactured and sold by Abcor, Incorporated of 850 Main Street, Wilmington, Mass. 01887, designated as HFM tubes and HFA-300-FEG Ultrafiltration Membrane. For example, one HFM membrane or tube used has a 10 mil membrane deposited on the inner surface backing, is organic solvent resistant, and passes dissolved molecules lower than 20,000 molecular weight and retains particles larger than 30 to 100 Å in diameter.

It is to be understood, of course, that multiple membrane tubes can be employed in sequence, particularly in commercial operations where large volumes of vinyl polymer latex have to be concentrated. Since the system is operated under pressure, the polymer latex is circulated through the tubes at a high rate and the water, containing the dissolved emulsifier(s) and other polymerization recipe materials, passes through the membranes into a permeate collection system from which, after analysis, is returned to the polymerization reactors. The amount of such water passing through the membrane is called the "flux rate" and is measured in gallons per square foot of membrane per day (GFD).

The membranes employed in the present invention have a finite resistance, depending on their physical characteristics. After continued use in the ultrafiltration of vinyl resin latices, these membranes develop further resistance due to fouling by the polymer particles. As a consequence, flux rates of the membranes are measured periodically with water to determine the degree of fouling and when the flux rates drop below about 100 GFD, they must be cleaned or regenerated. Cleaning can be accomplished very easily by rinsing with water and a mild detergent to restore the flux rates to acceptable levels, as determined by the tests on water flux. Periodically, however, the flux rate will be low enough that solvent cleaning will be required to remove the polymeric foulants that are not flushed off by water and mild detergent. When the membranes are employed in the ultrafiltration of PVC latices, methyl ethyl ketone has been found to be a very effective cleanser for the membranes. Merely soaking the membranes for a few minutes in the solvent will cleanse the same and restore the flux rates. The membranes useful in the present invention will have a flux rate with water in the range of about 200 to about 600 GFD.

As has been previously pointed out, the ultrafiltration step can be operated batchwise or continuously. In a batchwise operation, the polymer latex is pumped through the ultrafiltration unit or concentrator, the permeate is removed and sent to the polymerization reaction vessel for use in preparing the next batch of polymer, and the polymer latex is returned to the feed tank. This process is repeated until the desired concentration of polymer in the latex is reached. When making vinyl resins by the emulsion polymerization process the resultant polymer latex will usually have a solids or polymer content in the range of about 30% to about 50% by weight. It is preferred, however, to adjust the polymerization recipe and reaction conditions so as to obtain a polymer latex having a solids content in the range of about 35% to about 40%.

When employing a continuous ultrafiltration step, a series of ultrafiltration units or concentrators are employed. The pressure, and rate of flow of the vinyl polymer latex in each unit, is regulated so that the solids content of the latex leaving the ultrafiltration step is within the desired range. The permeate from each unit is analyzed for emulsifier content and fed back to the polymerization reactors. When the next charge is prepared, sufficient emulsifier is added to meet the requirements of the recipe. This amounts to considerable savings and the reuse of the permeate as such avoids the necessity of installing a recovery system, which would be necessary in order to comply with present day anti-pollution regulations. That is to say, the permeate, as it comes from the ultrafiltration system, cannot be disposed of through the sewer system. In the preparation of vinyl dispersion resins by the present process, the amount of emulsifier(s) in the permeate will be in the range of about 0.1% to about 0.5% by weight.

In the ultrafiltration step, the membrane tubes or circulating loops are served by heat exchangers in order to heat or cool the circulating vinyl polymer latex, as necessary. The membranes used in the present process can withstand temperatures up to about 81° C. The limiting factor on temperature is not the membranes but the polymer latices. Exposure of the polymer latices to high temperatures for extended periods of time adversely affects the heat stability of the vinyl polymers and colloidal stability of the latices. Accordingly, the ultrafiltration system should be operated at a temperature in the range of about 30° C. to about 70° C. The most preferred temperature range is from about 45° C. to about 60° C.

After the vinyl polymer latex has attained the desired total solids content in the ultrafiltration system, it is removed therefrom and the dispersion resin is isolated in powder form by means of spray drying. That is, a fine spray of the polymer latex is injected into a heated air chamber thereby removing the water and recovering the dried resin in powder form. Since the solids content of the latex has been considerably increased, there is much less water to be removed in spray drying. This results in a considerable saving in the heat energy expended to isolate the polymer in dry powder form. For example, when making a batch of PVC dispersion resin in a 5,000 gallon reactor, by means of the process of the present invention, there is a saving of about 55,000,000 BTU's in the spray drying step. Further, since the permeate is reused, there is a saving of 2,200 gallons of demineralized water.

One of the most surprising and unexpected aspects of the present invention is the reduction of polymer buildup on the internal surfaces of the reaction vessel when the permeate is employed as the reaction medium. It is not known, with any certainty, why this beneficial result stems from the use of the permeate as described. It is speculated however, that perhaps some compound or chemical may be formed during the polymerization reaction which passes through the membrane with the permeate during the ultrafiltration step which acts as an inhibitor, thus preventing the buildup of polymer on the surfaces of the reactor. The substantial reduction in polymer buildup is one of the big advantages of the present invention.

In order to evaluate the vinyl dispersion resins produced by the present invention, plastisols are made and tested. Plastisols of the dispersion resins are made by uniformly blending or intimately mixing, by conventional means, with 100 parts by weight of the dispersion resin in powder form, from about 30 to about 100 parts by weight of one or more plasticizers therefor. The useful plasticizers may be described as the alkyl and alkoxy alkyl esters of dicarboxylic acids or the esters of a polyhydric alcohol and monobasic acid. As examples of such materials, there may be named dibutyl phthalate, dioctyl phthalate, dibutyl sebecate, dinonyl phthalate, di(2-ethyl hexyl) phthalate, di(2-ethyl hexyl) adipate, dilauryl phthalate, dimethyl tetrachlorophthalate, butyl phthalyl butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

The plastisols made from the dispersion resins of the instant invention should have the desired yield and preferably with little or no dilatency. Yield is simply defined as resistance to flow and is normally determined numerically through viscosity measurements empolying well known standard techniques. Normally such values are arrived at by calculation from viscosity measurements using a Brookfield Model RVF Viscometer according to ASTM method D1824-61T. Yield is determined from viscosity measurements of the plastisols at varying r.p.m.'s (revolutions per minute) after initial preparation and at intervals of aging. The viscosity is measured in centipoises (cps.) at a temperature of 23° C. In the specific examples that follow hereinafter, viscosity measurements were made at varying rpms, for example, 2 rpm, 20 rpm, etc., and the values are expressed as $V_2$, $V_{20}$, etc.

To further illustrate the present invention, the following specific examples are given, it being understood that this is merely intended in an illustrative and not a limitative sense. In the examples all parts and percents are by weight unless otherwise indicated.

EXAMPLE I

In this example a series of runs were made to show the repeated reuse of the permeate from the ultrafiltration step. In these runs, the following polymerization recipe was employed:

| | |
|---|---|
| Vinyl chloride | 100 parts |
| Water (demineralized) | 140 |
| Sodium lauryl sulfate | 0.9 |
| Alcohol 12 C's + 18 C's(straight chain) | 2.1 |
| Di(secondary butyl) peroxydicarbonate | 0.015 |
| Diisononoyl peroxide | 0.05 |

In each of the runs a monomer premix tank or vessel was evacuated. Then the premix tank was charged with the water and then, with agitation, with the alcohol. The premix was then cooled to 18° C. whereupon the di(secondary butyl) peroxydicarbonate and the diisononoyl perioxide were charged to the premix. The vacuum was maintained in the premix tank and the emulsifier sodium lauryl sulfate was added to the premix. The agitation was continued for one minute at 300 rpm. after addition of the emulsifier. Thereafter the vinyl chloride was charged and the agitator started and run for 15 minutes at 300 rpm. Then the mixture (monomer premix) was passed through a Manton-Gaulin 2 stage homogenizer at a temperature of 25° C. into the polymerization reactor which had previously been evacuated. The pressure in the first stage of the homogenizer was 600 psig. and in the second stage was 700 psig. Thereafter the contents of the reactor were heated to the polymerization temperature, namely 45° C. and held there throughout the reaction until the desired conversion was obtained (evidenced by a drop in pressure to 60 psig.). Thereafter the reactor was cooled, vented and the PVC latex was run through an ultrafiltration unit containing a semipermeable membrane which was made by Abcor, Inc. of Wilmington, Mass. and identified as "Abcor HFA-300-FEG". The PVC latex was passed through the ultrafiltration unit at a temperature of 45° C. and under a pressure of 10–50 psig. The permeate, or liquid passing through the membrane, was recycled to the premix tank where it was found to contain 0.14% by weight of sodium lauryl sulfate. Thereafter, using the permeate, a second premix was made, as recited above except that the amount of sodium lauryl sulfate added was only that needed to bring the total emulsifier content to 0.9 part.

The same process, as above, was repeated a number of times so as to employ 1st, 2nd and 3rd generation permeates.

In each case, in order to determine RVF viscosity plastisols were made with the resin or PVC of each run using the following recipe:

| | |
|---|---|
| PVC | 100 parts |
| Dioctyl Phthalate | 40 parts |
| Dioctyl adipate | 30 parts |
| Expoxidized soybean oil | 5 parts |
| Ca—Zn phosphite | 3 parts |

After each run, the polymer buildup was noted. The date with respect to viscosity and other pertinent data is given in the following Table I:

TABLE I

| | | CONTROL | 1st GENERATION PERMEATE | | |
|---|---|---|---|---|---|
| | | | 1 | 2 | 3 |
| BROOKFIELD VISCOSITY | | | | | |
| Initial | $V_2$ | 40,000 | 62,500 | 40,000 | 50,000 |
| | $V_{20}$ | 17,000 | 23,000 | 16,500 | 15,500 |
| 1 Day | $V_2$ | 95,000 | 160,000 | 110,000 | 67,500 |
| | $V_{20}$ | 27,500 | 44,000 | 34,000 | 25,000 |
| 7 Days | $V_2$ | 95,000 | 150,000 | 120,000 | 130,000 |

TABLE I-continued

|  |  |  |  |  |  |
|---|---|---|---|---|---|
| 1 Day @40° C. | $V_{20}$ | 27,500 | 47,000 | 39,000 | 40,000 |
|  | $V_2$ | 67,500 | 110,000 | 80,000 | 95,000 |
|  | $V_{20}$ | 22,500 | 31,000 | 28,000 | 27,500 |
| SEVERS EFLUX |  | 8.3 | 7.43 | 7.00 | 10.1 |
| NORTH FINENESS |  | 3/0 | 0 | 0 | 0/0 |
| HEAT STABILITY @ 375° F. IN MINUTES |  |  |  |  |  |
| INITIAL CHANGE |  | 30 | 25 | 25 | 30 |
| YELLOW |  | 35 | 30 | 30 | 35 |
| DARK |  | 40 | 35 | 35 | 40 |
| POLYMER BUILDUP |  |  |  |  |  |
| WALL THICKNESS - 1/8"-1/4" |  | ← 1/16"-1/8" → |  |  |  |
| % HOSED OFF - 75 |  | 85 |  |  |  |
| POUNDS HOSED OFF - 2.3 |  | 1.17 |  |  |  |

|  |  | CONTROL | 2nd GENERATION PERMEATE | | | 3rd GENERATION PERMEATE | CONCENTRATE 4th GENERATION RESIN |
|---|---|---|---|---|---|---|---|
|  |  |  | 4 | 5 | 6 | 7 | 8 |
| BROOKFIELD VISCOSITY |  |  |  |  |  |  |  |
| Initial | $V_2$ |  | 22,500 | 15,000 | 16,000 | 32,000 | 25,000 |
|  | $V_{20}$ |  | 15,000 | 13,500 | 17,600 | 14,000 | 12,000 |
| 1 Day | $V_2$ |  | 77,500 | 52,500 | 47,500 | 65,000 | 57,500 |
|  | $V_{20}$ |  | 26,000 | 23,000 | 22,750 | 21,500 | 21,000 |
| 7 Days | $V_2$ |  | 230,000 | 85,000 | 90,000 | 72,500 | 70,000 |
|  | $V_{20}$ |  | 68,000 | 28,000 | 31,000 | 23,500 | 24,250 |
| 1 Day @40° C. | $V_2$ |  | 75,000 | 77,500 | 85,000 | 65,000 | 57,500 |
|  | $V_{20}$ |  | 23,000 | 24,750 | 23,000 | 20,000 | 19,250 |
| SEVERS EFFLUX |  |  | 7.60 | 8.00 | 9.95 | 10.53 | 10.70 |
| NORTH FINENESS |  |  | 3/0 | 3/0 | 4/0 | 3/0 |  |
| HEAT STABILITY @ 375° F. IN MINUTES |  |  |  |  |  |  |  |
| INITIAL CHANGE |  |  | 25 | 25 | 25 | 25 | 25 |
| YELLOW |  |  | 35 | 35 | 35 | 35 | 35 |
| DARK |  |  | 45 | 45 | 45 | 45 | 45 |
| POLYMER BUILDUP |  |  |  |  |  |  |  |
| WALL THICKNESS |  |  | ← 1/8"-1/4" → |  |  | 1/16"-1/8" |  |
| % HOSED OFF |  |  | 80 |  |  | 80 |  |
| POUNDS HOSED OFF |  |  | 1.02 |  |  | 1.20 |  |

The improved results of the present invention can be seen from the results in the above Table. The unexpected improvement is the reduction in polymer buildup and what buildup does occur is of the soft, loosely held type and is very easily washed from the surfaces of the reactor.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process of producing homopolymers of vinyl and vinylidene halides and copolymers thereof with each other or either with one or more other vinylidene monomers having at least one terminal $CH_2=C<$ grouping comprising, forming a monomer premix in a reaction zone, said premix containing the aqueous reaction medium, the monomer or monomers to be polymerized, from about 0.02% to about 1.0% by weight of a free radical yielding catalyst based on the weight of 100 parts of monomer(s) being polymerized, up to about 6.0% by weight of an emulsifier based on the weight of 100 parts of monomer(s), polymerizing said premix in said reaction zone with agitation at a temperature in the range of about 30° C. to about 70° C. to produce a vinyl resin latex, passing said latex through a stripping zone to remove unreacted monomer(s) therefrom with steam, passing the stripped latex to an ultrafiltration zone wherein the latex is forced through a semipermeable membrane leaving behind the vinyl polymer particles in a range of about 30% to about 60% total solids, circulating the emulsifier containing permeate from said ultrafiltration zone to the reaction zone for use as the aqueous reaction medium, passing said vinyl polymer particles in concentrated latex form to a drying zone and recovering the polymer or copolymer in dry unagglomerated powder form, whereby polymer buildup in said reaction zone is substantially reduced when using said emulsifier containing permeate as the reaction medium.

2. A process as defined in claim 1 wherein the monomer is vinyl chloride.

3. A process as defined in claim 1 wherein the pH in the reaction zone is maintained in the range of about 7.0 to about 12.0.

4. A process as defined in claim 1 wherein a pressure is maintained in the ultrafiltration zone in the range of about 5 psig. to about 60 psig.

5. A process as defined in claim 1 wherein the amount of emulsifier in the permeate is in the range of about 0.1% to about 0.5% by weight.

6. A process as defined in claim 1 wherein at least one long straight chain alcohol is added to the monomer premix, said alcohol containing from 8 to 24 carbon atoms and wherein the ratio of alcohol to emulsifier is 1.0 or greater.

7. A process as defined in claim 1 wherein the emulsifier is sodium lauryl sulfate.

8. A process as defined in claim 1 wherein the catalyst is benzoyl peroxide.

9. A process as defined in claim 2 wherein the pH in the reaction zone is maintained in the range of about 8.0 to about 10.5.

10. A process as defined in claim 9 wherein a pressure is maintained in the ultrafiltration zone in the range of about 10 psig. to about 50 psig.

11. A process as defined in claim 1 wherein the temperature in the ultrafiltration zone is maintained in the range of about 30° C. to about 70° C.

12. A process as defined in claim 10 wherein the amount of emulsifier in the permeate is in the range of about 0.1% to about 0.5% by weight.

13. A process as defined in claim 12 wherein the emulsifier is sodium lauryl sulfate.

14. A process as defined in claim 13 wherein the temperature in the ultrafiltration zone is maintained in the range of about 30° C. to about 70° C.

15. A process as defined in claim 14 wherein the catalyst is benzoyl peroxide.

16. A process as defined in claim 15 wherein at least one long straight chain alcohol is added to the monomer premix, said alcohol containing from 8 to 24 carbon atoms and wherein the ratio of alcohol to emulsifier is 1.0 or greater.

* * * * *

UNITED STATES PATENT AND TRADEMARK OFFICE
CERTIFICATE OF CORRECTION

PATENT NO. : 4,340,702

DATED : July 20, 1982

INVENTOR(S) : George R. Huddleston, Jr. and James W. Turner

It is certified that error appears in the above-identified patent and that said Letters Patent are hereby corrected as shown below:

Column 1, line 20, "Hoever" should read --However--

Table I - continued

North Fineness Column 6, column 7, column 8
should read    --3/0      4/0      3/0--

Signed and Sealed this

*Fourth* Day of *December 1984*

[SEAL]

*Attest:*

GERALD J. MOSSINGHOFF

*Attesting Officer*  *Commissioner of Patents and Trademarks*